United States Patent [19]

Ozeki et al.

[11] Patent Number: 5,208,965
[45] Date of Patent: May 11, 1993

[54] METHOD FOR PRODUCING MAGNETIC HEAD HAVING TRACK REGULATION GROOVES FORMED AT TAPE SLIDING SURFACE

[75] Inventors: Makoto Ozeki; Takashi Tsutsui; Sohei Ohara, all of Yokohama; Kouji Nemoto, Yokosuka, all of Japan

[73] Assignee: Victor Company of Japan, Ltd., Yokohama, Japan

[21] Appl. No.: 751,591

[22] Filed: Aug. 20, 1991

Related U.S. Application Data

[62] Division of Ser. No. 464,135, Jan. 16, 1990, Pat. No. 5,060,102.

[30] Foreign Application Priority Data

Jan. 17, 1989 [JP] Japan .................................. 1-8128

[51] Int. Cl.⁵ .................................. G11B 5/42
[52] U.S. Cl. .................................. 29/603; 360/127
[58] Field of Search .................. 29/603; 360/125–127

[56] References Cited

U.S. PATENT DOCUMENTS

| | | | |
|---|---|---|---|
| 4,316,228 | 2/1982 | Fujiwara et al. | 360/120 |
| 4,425,701 | 1/1984 | Takahashi et al. | 360/121 |
| 4,602,307 | 7/1986 | Toriu et al. | 360/125 |
| 4,731,683 | 3/1988 | Otomo et al. | 360/122 |
| 4,755,899 | 7/1988 | Kobayashi et al. | 360/125 |
| 4,811,146 | 3/1989 | Niwa | 360/119 |
| 4,819,113 | 4/1989 | Kubota et al. | 360/126 |
| 4,821,134 | 4/1989 | Niwa | 360/125 |
| 4,888,658 | 12/1989 | Ono et al. | 360/122 |
| 4,916,563 | 4/1990 | Kawase | 360/122 |

FOREIGN PATENT DOCUMENTS

60-263303 12/1985 Japan .
61-5406 1/1986 Japan .
61-229208 10/1986 Japan .

Primary Examiner—Carl E. Hall
Attorney, Agent, or Firm—Jacobson, Price, Holman & Stern

[57] ABSTRACT

A method for producing a magnetic head having a head core which includes a first head core half body (22) having a winding groove (22b) at one side surface thereof, a second head core half body (23) having one side surface joined with the side surface of the first body, both half bodies being fixed by mold glass (25) about a joined plane thereof via a gap spacer (24) of material having a melting point higher than the mold glass, and one end surface (20a) normal to the joined plane and shaped into an arc to become a tape sliding surface having a magnetic gap at the joined plane. The first and second head core half bodies are formed from pole shaped bodies (26, 27) having long grooves (26a, 26b, 26c, 27a) and notches (26d, 27b) cut therein after which the pole shaped bodies are joined together by abutting the notched faces (24, 26B, 27B) together and joining them by molding melted glass in the notches (26d, 27b) and groove (26c). After solidifying the glass, the magnetic heads are cut off on planes through the notches and grooves. The first body has a back groove (22c) formed by cutting out a part near the other end surface opposite to that on which the sliding surface (20a) is formed, and a pair of first track width regulation grooves (22d) cut out of both corners of the joined plane and having a slant at a predetermined angle (DEG₁) extending from a portion near the opposite end toward the sliding surface (20a) and transverse to the winding groove (22b). The second body (23) has a pair of second track width regulation grooves (23b) cut out of both corners between the joined plane and the sliding surface (20a) on a slant at a predetermined angle from the middle of the winding groove (22b) to the sliding surface. The mold glass (25) is filled into the back groove (22c) and the first and second regulation grooves for fixing the first and second bodies by solidification after cooling.

12 Claims, 7 Drawing Sheets

METHOD FOR PRODUCING MAGNETIC HEAD HAVING TRACK REGULATION GROOVES FORMED AT TAPE SLIDING SURFACE

This is a division of application Ser. No. 07/464,135, filed Jan. 16, 1990, now U.S. Pat. No. 5,060,102.

BACKGROUND OF THE INVENTION

The present invention relates to a method for producing magnetic head used in a magnetic recording/reproducing system, more particularly to a magnetic head having mold glass filled into a slot for regulating a track width thereof.

A conventional magnetic head is shown in FIGS. 1A to 1D. In the figure, a magnetic head 1 comprises magnetic core half bodies 2 and 3 made of ferromagnetic materials such as a single crystal ferrite of manganese and zinc, a gap spacer 4 attached to the half bodies 2 or 3, and a binder 5 for uniting the half bodies 2 or 3 one with the other and made of solidified glass to which a mold glass is cooled and hardened.

The half body 2 has a winding guide 2a which is cut off a part of the outer end from the body 2, a winding groove 2b cut out of a part of an inner end wall thereof, and a pair of track width regulation grooves 2c which are cut out of top parts of both side corners of the body 2. The half body 3 has a winding guide 3a cut out of the outer end wall of the body 3, a back groove 3b cut out of the bottom corner of the inner side of the body 3, and a pair of track width regulation grooves 3c which are cut out of top parts of both side corners of the body 3 corresponding to the grooves 2c.

The head 1 has a tape sliding surface 1a formed at the upper surface thereof, and a magnetic gap 1b made by the gap spacer 4. The gap spacer 4 is formed in a thin layer and made of non-magnetic substances such as silicon oxide ($SiO_2$), aluminum oxide ($Al_2O_3$) or the like, which are harder than the glasses and have a high melting point. On the sliding surface 1a, a track width regulation portion is formed by the grooves 2c and 3c for regulating a track width of a magnetic tape (not shown). As the gap spacer 4 lies between the upper portions of the half bodies 2 and 3, the gap spacer 4 causes the bodies 2 and 3 to have an angle of theta degrees. Mold glass pieces 5 are caulked in the back groove 3b and the regulation grooves 2c and 3c, respectively. A gap 6 at an angle of theta degrees is formed between the inside surfaces of the bodies 2 and 3 by the gap spacer 4 the magnetic gap 1b being extended downward in the figures.

The magnetic head 1 having the above configuration is manufactured by a method including the following steps. At first, two pole-shaped materials respectively corresponding to five or six half bodies 2 and 3 are provided and a spacer material corresponding to five or six gap spacers 4 is located between upper portions of core materials. At this time, two long grooves have been already formed at predetermined portions of the inside and outside surfaces of the material of the body 2 in the longitudinal direction respectively corresponding to the guide 2a and groove 2b. Two long grooves have been already formed at predetermined portions of the inside and outside surfaces of the material of the body 3 in the longitudinal direction respectively corresponding to the guide 3a and back groove 3b, also.

Secondly, glass rods which melt at a predetermined temperature are respectively allotted to positions corresponding to the regulation grooves 2c and 3c. The same glass rod is allotted to a position corresponding to the back groove 3b. Then, the glass rods are melted by adding at a predetermined temperature while the materials continue to have a predetermined angle theta. As the glass is cooled down and solidified after melting, the materials are fixed by the solidified glass material.

Lastly, after an upper surface of the materials connected in a pole-shaped body is polished and shaped in an arc, the materials are cut in five or six pieces having a predetermined width. After that, the magnetic head 1 shown in FIGS. 1A to 1D is completed.

The magnetic head 1, which has the aforementioned configuration and is manufactured by the above method, is formed in the manner of having the magnetic gap 1b, so that the gap 6 must be formed at a lower joint plane of the half bodies 2 and 3. The head 1 has a problem that the gap 6 causes the head 1 to form a crack 7, thereby generating a problem of a large deterioration in the mechanical strength.

In order to prevent the crack occurring in the above example, there is proposed a magnetic head 10 according to another conventional example as shown in FIGS. 2A to 2D. The head 10 comprises half bodies 12 and 13, respectively corresponding to the bodies 2 and 3, and which are joined by a binder 15 corresponding to the binder 5 of the head shown in FIGS. 1A to 1D. Accordingly, the half bodies 12 and 13 have winding guides 12a and 13a and winding grooves 12b and 13b, respectively. Furthermore, both sides along joined end surfaces of the bodies 12 and 13 are cut out to form uniting grooves 12c and 13c in which the binder 15 is plugged. An upper surface of the head 10 is formed into an arc shape to become a tape sliding surface 10a, and a track regulation groove is formed by the binder 15. A magnetic gap 10b is formed by a united plane of the bodies 12 and 13 on the sliding surface 10a in the same manner as the aforementioned example shown in FIGS. 1a to 1D.

As the magnetic head 10 according to the prior art shown in FIGS. 2A to 2D is manufactured by substantially the same steps as those of the head 1 shown in FIGS. 1A to 1D, duplicate explanation is omitted.

Figure 1A:
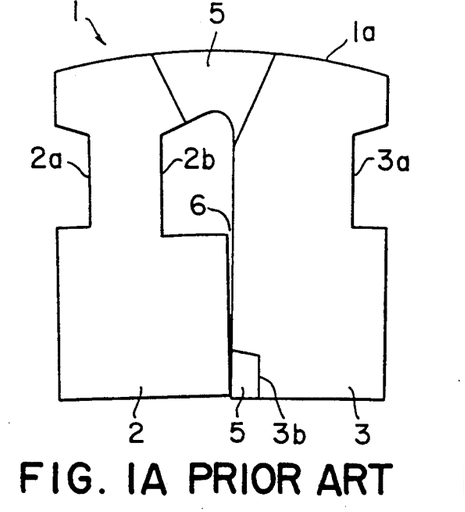
FIGS. 1A to 1D are respectively a front view, plan view, cross sectional view taken along line I—I in FIG. 1B, and a perspective view, showing an example of a conventional magnetic head.
Figure 1B:
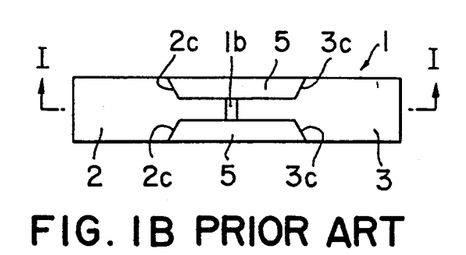
Figure 1C:
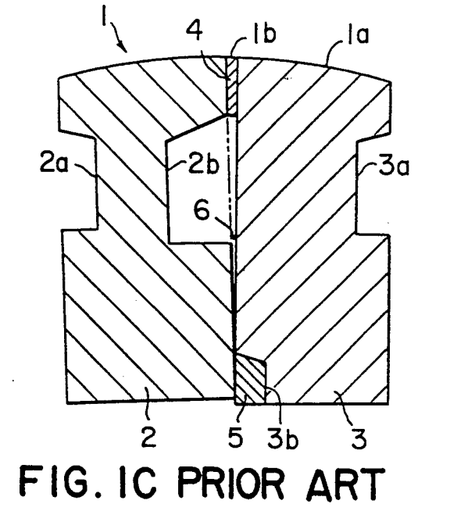
Figure 1D:
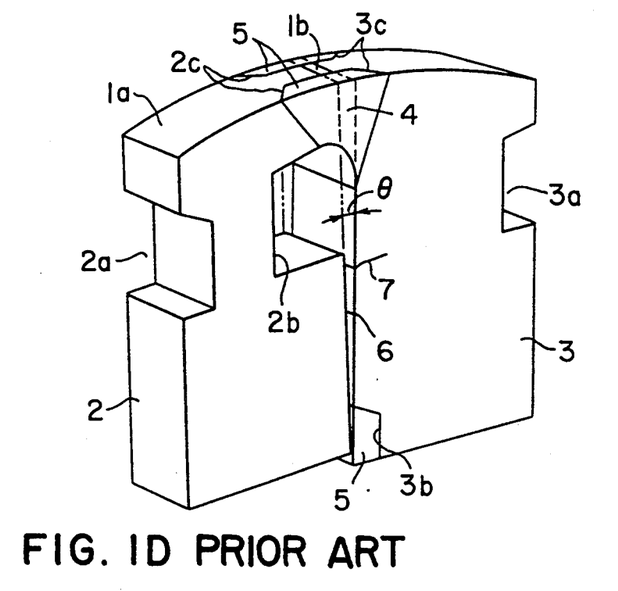
Figure 2A:
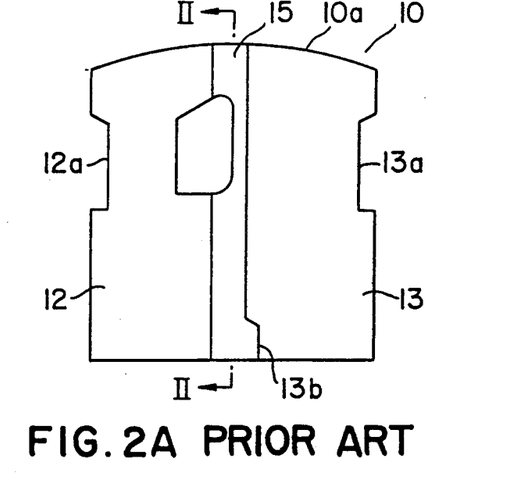
FIGS. 2A to 2D are respectively a front view, plan view, cross sectional view taken along line II—II in FIG. 2A, and a perspective view showing another example of a conventional magnetic head.
Figure 2B:
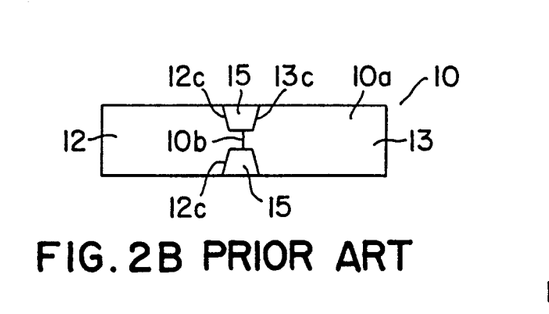
Figure 2C:
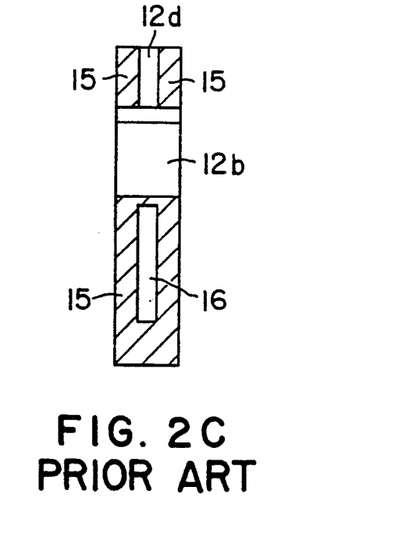

In the example, as shown in FIG. 2C which is a cross sectional view of FIG. 2A on a cutting line II—II, though the binder 15 after solidification of the mold glass is provided around the lower united plane of the bodies 12 and 13, the head 10 has a problem that a gap 16 is formed between the bodies 12 and 13. As a joined area of a back gap portion, that is, the lower united area between the bodies 12 and 13 becomes smaller, a magnetic reluctance becomes larger, so that the head 10 has the problem of the magnetic characteristics deteriorating.

Figure 2D:
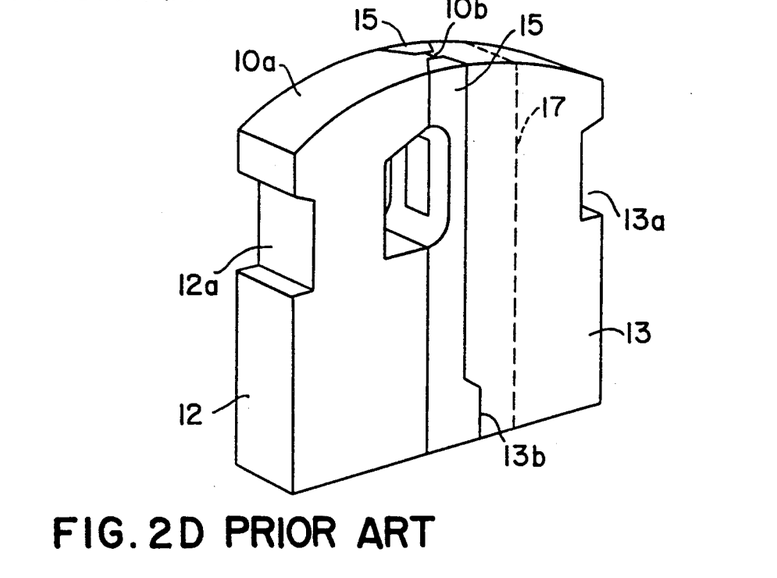

The magnetic head 10 is not only used as the complete head having a single magnetic gap 10b shown in FIG. 2D, but also as a so-called double azimuth head comprising two heads which are cut off at cutting lines 17 of the bodies 13, as represented by the dotted line shown in FIG. 2D, respectively, and set on a base (not shown). In the case that the heads 10 are used in the double azimuth head, it is possible to cut off the back grooves 13b when the bodies 13 are cut, because the distance between the cutting line 17 and the back groove 13b is insufficient. Therefore, the head 10 involves the problem of checking the workability of the manufacture of the head.

The former head 1 has a crack 7 or the like and has a smaller joined area of the half bodies, as mentioned before, so that the head has the problem of a deteriorated magnetic resistance and other magnetic characteristics.

SUMMARY OF THE INVENTION

The present invention solves the aforementioned problems, and an object of this invention is to provide a method for producing magnetic head having enough mechanical strength and excellent magnetic characteristics by holding enough united area of the back gap portion.

Another object of this invention is to provide a production method for a magnetic head capable of manufacturing such an excellent head rapidly and suitably.

In order to achieve the above objects, the method for producing magnetic head according to the present invention includes a head core which comprises a first head core half body having a winding groove at one side surface thereof, and a second head core half body having at least one side surface, and in which the side surface of the first body is joined with the side surface of the second body, both bodies being fixed by mold glass about joined planes of the half bodies via a gap spacer having a melting point higher than the mold glass, and one end surface extending at a right angle with the joined planes, is shaped into an arc to become a tape sliding surface having a magnetic gap at a joined portion of both bodies. The first half body comprises a back groove formed by cutting out a part nearby the other end surface opposite to the surface on which the sliding surface is formed, and a pair of first track width regulation grooves which are formed by cutting out both corners of the joined plane thereof in a manner of having a slant of a predetermined angle from a portion nearby the opposite end toward the direction of the sliding surface and being across the winding groove. The second half body comprises a pair of second track width regulation grooves cut off both corners between the joined plane and the sliding surface on a slant at a predetermined angle from the middle of the winding groove to the sliding surface Mold glass is filled into the back groove and the first and second track width regulation grooves in order to fix the first and second half bodies by solidification after cooling.

Furthermore, the production method of the magnetic head comprises: a step of cutting out a second deep-and-long groove corresponding to a back groove of a completed head and parallel to a first deep-and-long groove corresponding to a winding groove of a completed head on a joined plane of a first core half body material which is made of ferromagnetic substance and corresponding to a plurality of first magnetic core half bodies; a step of cutting out a plurality of first notches on a slant from portions nearby the second deep groove to the surface of a side of the first deep groove being across the first deep groove; a step of cutting a plurality of second checks corresponding to the first notches on a joined plane of a second core half body material which is made of a ferromagnetic substance and corresponding to a plurality of second magnetic core half bodies; a step of connecting the first material with the second material at both joined surfaces by causing the first and second notches to correspond with each other; a step of fixing the first and second materials by cooling and solidification of melted glass which is molded into the second deep groove and the first and second notches; a step of regulating the entire shape of a joined body by adding a predetermined treatment to a predetermined outer surface; and a step of dividing the joined body into a plurality of magnetic heads having a predetermined shape by slicing at the portions with the notches.

As the magnetic head having the aforementioned configuration has the first and second bodies which are sufficient to maintain the back gap and are properly fixed between the joined planes of both bodies, it is possible to prevent the occurrence of damage such as cracking of the joined surfaces of the half bodies and assuring proper mechanical strength.

Furthermore, as the magnetic head is manufactured by the aforementioned steps it is possible to properly connect and fix the first and second half body materials to each other and thereby improve a manufacturing yield.

Still further, as the head having a complicate shape is manufactured by simple steps, it is possible to reduce the manufacturing cost of the magnetic head.

DETAILED DESCRIPTION OF THE PREFERRED EMBODIMENTS

There are described in detail hereinafter preferred embodiments of a magnetic head and its production method according to the present invention with reference to the accompanying drawings.

Figure 3A:
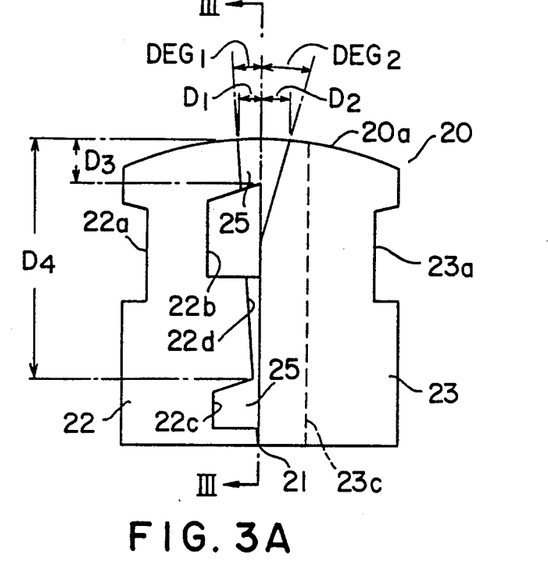
FIGS. 3A to 3D are, respectively, a front view, plan view, cross sectional view taken along line III—III in FIG. 3A, and a perspective view, showing a magnetic head made according to a first embodiment of the present invention.
Figure 3B:
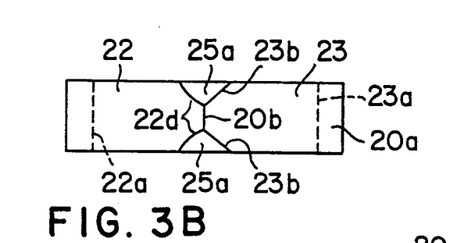
Figure 3C:
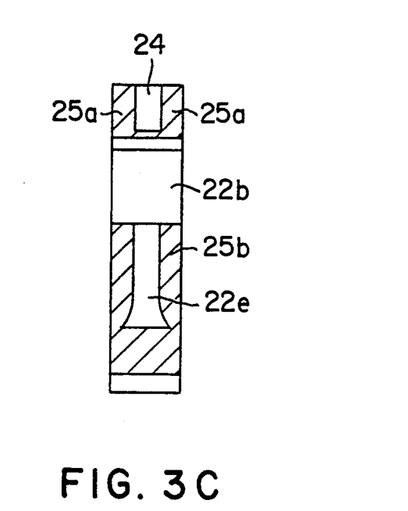

In FIGS. 3A to 3D showing a first embodiment of this invention, a magnetic head 20 schematically comprises first and second core half bodies 22 and 23 made of ferromagnetic materials such as a ferrite of manganese and zinc or the like, and mold glass 25 for fixing together the first and second bodies 22 and 23. One of the outer wall surfaces, which extends at right angles with a joined surface between the half bodies 22 and 23, is formed in an arc to become a tape sliding surface 20a on which a magnetic gap 20b is formed, as shown in FIG. 3B. The magnetic gap 20b, as shown in FIG.3C, is concretely made by a gap spacer 24 such as a quartz member attached to any uniting surface of half body 22 or 23. The gap spacer 24 is made of a non-magnetic substance such as $SiO_2$ or $Al_2O_3$ having a high melting point.

The first half body 22 having a substantially rectangular solid as a whole form, comprises a winding guide 22a which is a shallow cut out of a part of the remote wall from the uniting surface, a winding groove 22b which is deeply cut out of a part of the uniting surface corresponding to the guide 22a, a back groove 22c which is deeply cut out of a part of the uniting surface near a corner thereof with the sliding surface and parallel to the groove 22b, and first track width regulation grooves 22d which are cut out of both corners of the uniting surface in the manner that the grooves 22d slant in a predetermined angle $DEG_1$ from a starting point 21 to the sliding surface across the back groove 22c and winding groove 22b. A back gap portion 22e is formed by cutting the grooves 22d which also forms the gap spacer 24 having a shape shown in FIG. 3C.

The second half body 23 is also a substantially rectangular solid having a shape corresponding to the body 22. The body 23 comprises a winding guide 23a which is cut out of a part of the wall surface remote from the uniting surface with body 22, and second track width regulation grooves 23b which are slantly cut out of both corners of the sliding surface side of the uniting surface of the body 23 in a predetermined angle $DEG_2$.

The mold glass 25 has three portions 25a, 25a and 25b in the first embodiment corresponding to the back groove 22c, and the first and the second regulation grooves 22d and 23b, respectively, which are formed on the first and second half bodies 22 and 23. The portions 25a and 25a are shaped in an arrowhead to fit portions of the sliding surface side of the first regulation grooves 22d and the second regulation grooves 23b, while the portion 25b has a rectangular part to fit the back groove 22c and two projecting parts to fit under portions of the first regulation grooves 22d.

In the first embodiment, four degrees are proper for the angle $DEG_1$, and fifteen degrees are best suited for the angle $DEG_2$. Testing the head after completion proves that these are the best mode for the angles. Furthermore, actual articles have sizes where a distance $D_1$ is 0.14 mm plus or minus 0.02 mm and equal to a distance $D_2$, a distance $D_3$ is about 0.05 mm, and a distance $D_4$ is about 1.5 mm. Articles having this size are the best mode for utilization of the invention.

Next, there is described a production method of the magnetic head 20 according to the first embodiment and with reference to FIGS. 4A to 4F.

Figure 4A:
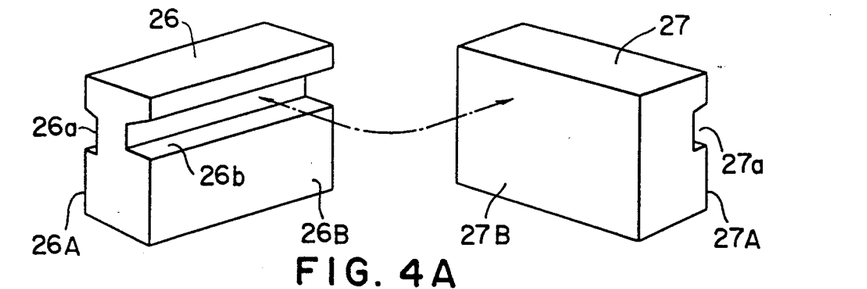
FIGS. 4A to 4F are perspective views respectively showing manufacturing steps of the magnetic head according to the first embodiment of the present invention.

There, are provided a first material 26, which is made of a ferromagnetic substance such as a ferrite of manganese and zinc and which has a pole-shaped body corresponding to five or six articles of the first core half bodies 22, and a second material 27, which is also made of a ferromagnetic substance and has a pole-shaped body corresponding to five or six articles of the second core half bodies 23. The first material 26, as shown in FIG. 4A, has a shallow-and-long groove 26a formed on outer wall 26A which is the wall remote from uniting surface 26B, and a deep-and-long groove 26b formed on the uniting surface 26B. The grooves 26a and 26b respectively correspond to the winding guide 22a and the winding groove 22b when the heads are completed as articles. The material 27 also has a shallow-and-long groove, which is formed on outer wall 27A surface remote from uniting surface 27B corresponding to the winding guide 23a of the completed head 20. Although the steps of cutting out the long grooves 26a, 26b and 27a and the first steps of making the head 20, because a conventional production method includes the same or equivalent step as the first step, the groove cutting steps are only preliminary and featureless step in this invention.

Figure 4B:
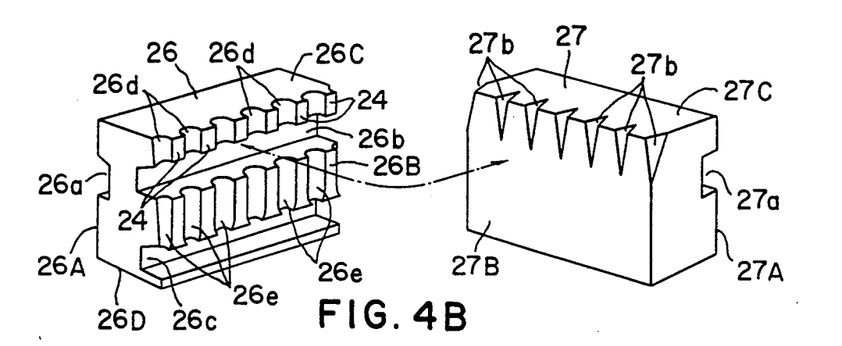

In the next step of this method, a deep-and-long groove 26c is formed on the uniting surface 26B nearby outer wall 26D, as shown in FIG. 4B, which is parallel with the long groove 26b and becomes the back groove 22c when the head 20 is completed. Next, a plurality of notches 26d are formed on a surface between the groove 26b and the surface 26C by cutting out several portions of the uniting surface 26B in the direction transverse to the groove 26b. In the example shown in the figures, five complete notches and two half notches are cut in order to produce six articles. A plurality of notches 26e are formed on a surface between grooves 26b and 26c as if the notches 26d are extended to the corner of the surface 26D by the same manner as the notches 26d. The nearer the notches 26d and 26e get to a corner of the surface 26C, the broader and deeper they are. On the other hand, a plurality of notches 27b are formed at a corner between uniting surface 27B and surface 27C corresponding to the notches 26d. In this example, five complete and two half notches 27b are formed in the same manner as the notches 26d. Then, the gap spacers 24 are attached with a predetermined thickness to partial surfaces of the uniting surface 26B surrounded by the notches 26d and the groove 26b by spattering quartz or the like.

Figure 4C:
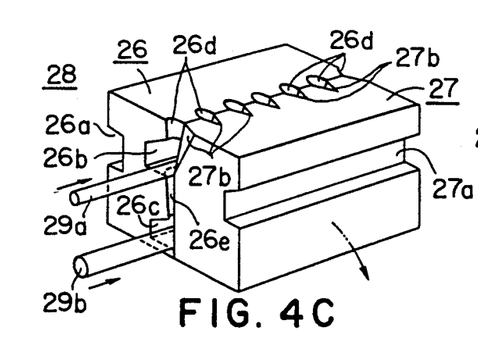

Both materials 26 and 27 are interconnected at the uniting surfaces 26B and 27B according to an arrow of a dot-and-dash line shown in FIGS. 4A and 4B and temporarily fixed to become a united body 28 as shown in FIG. 4C. After that, glass rods 29a and 29b are set in predetermined positions. The united body 28 is then inverted and the glass is melted to plug the back groove 26c and the notches 26d, 26e and 27b.

Figure 4D:
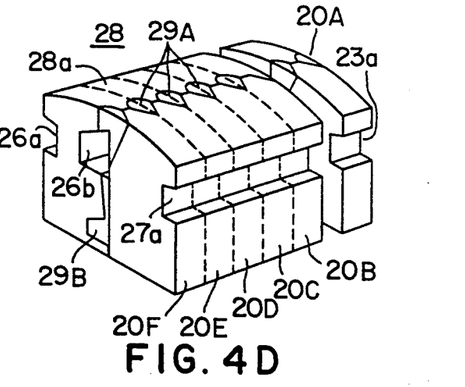

Full plugged glass is cooled to a predetermined temperature to solidify and become solid-state glass pieces 29A and 29B shown in FIG. 4D as a binder, so that the united body 28 is properly fixed in one body. A curved surface 28a is formed by cutting or polishing, to produce the tape sliding surface after articles complete of each article when complete at upper surfaces in the figures corresponding to the surfaces 26C and 27C of the materials 26 and 27. The united body 28 is sliced into a plurality of magnetic heads 20A to 20F having a predetermined size and so as to obtain the desired articles.

Figure 3D:
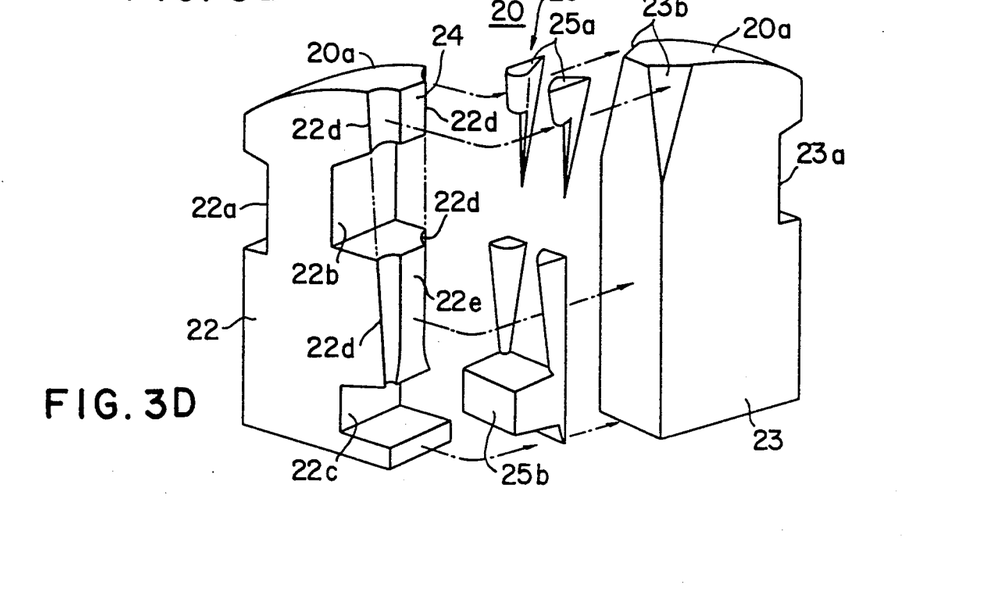
Figure 4E:
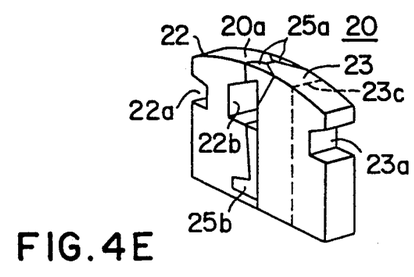
Figure 4F:
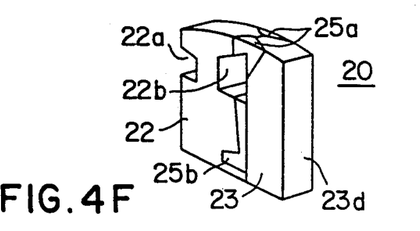

FIG. 4E is a perspective view showing a complete magnetic head as an article, and corresponds to the exploded perspective view shown in FIG. 3D if the head 20 is exploded for the sake of convenience. Although the magnetic head 20 is completed in the first place through the aforementioned steps shown in FIGS. 4A to 4E, a reprocessed head 20 shown in FIG. 4F is produced by cutting the half body 23 at a dotted line 23c in FIG. 4E in continued steps according to request. When two reprocessed heads 20 are assembled on a base (not shown) in the manner of facing the cut surfaces 23d to each other, it is possible to obtain the so-called double azimuth head (as mentioned in the explanation of the prior art) having two magnetic gaps.

Figure 5A:
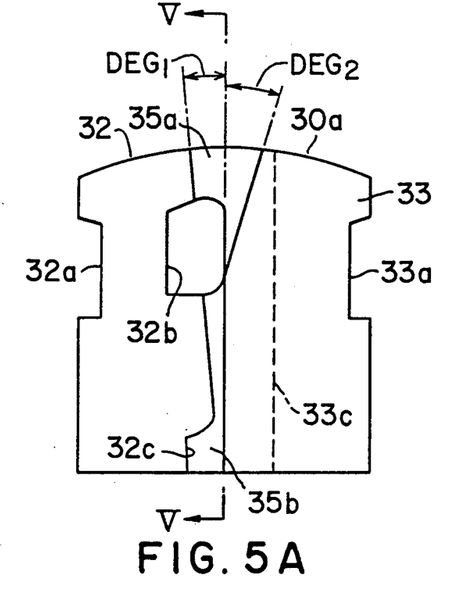
FIGS. 5A to 5D are, respectively, a front view, plan view, cross sectional view taken along line V—V in FIG. 5A, and a perspective view showing a magnetic head made according to a second embodiment of the present invention.
Figures 5B, 5D:
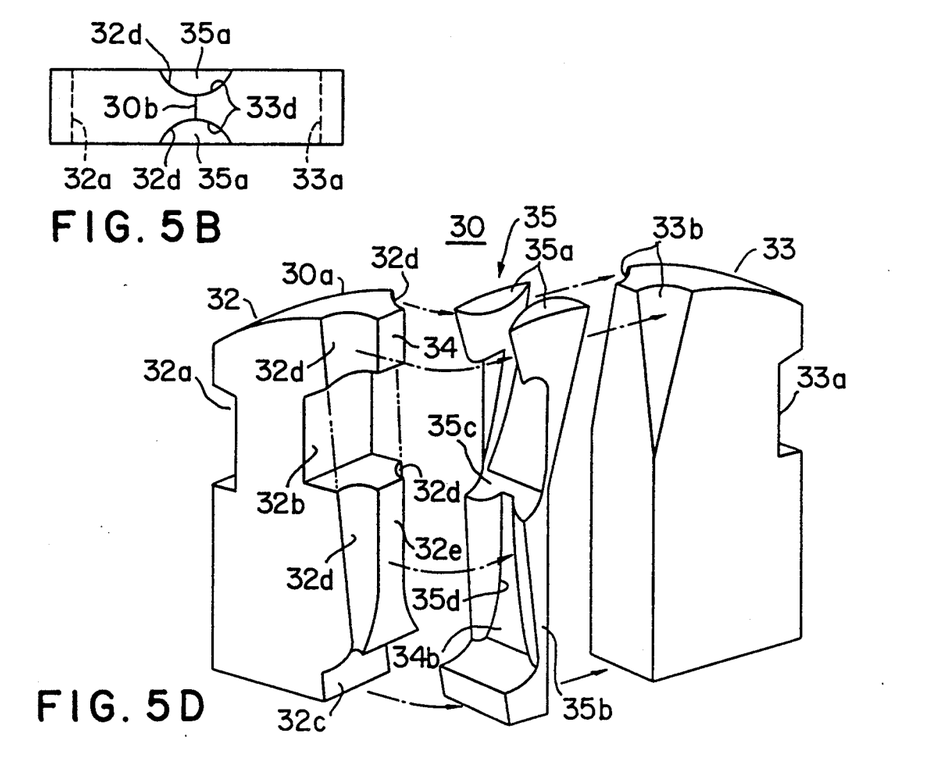
Figure 5C:
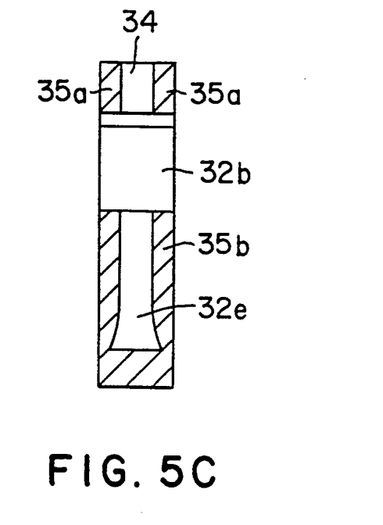

Although the back groove 22c is described as a deep groove which is formed by leaving the corner between the uniting surface corresponding to 26B and the opposite surface with sliding surface 20a, the present invention is not limited to such a configuration and may have a configuration of a magnetic head 30 according to a second embodiment as shown in FIGS. 5A to 5D. In the figures, the numerals 32, 33 and 35 are equivalent to the half bodies 22 and 23 and the fixing glass 25 in FIGS. 3A to 3D. The head 30 also has a tape sliding surface 30a and a magnetic gap 30b. The body 32 has a winding guide 32a, a winding groove 32b, a back groove 32c, and a first regulation groove 32d, as shown in FIG. 5D. A gap spacer 34 is attached on a joined plane between the half bodies 32 and 33, so that a back gap 32e remains between the grooves 32b and 32c. The spacer 34 is made of quartz or the like and has a suitable thickness such as 0.3 micron. The half body 33 has a winding guide 33a and a second regulation groove 33b.

The second embodiment is different from the first embodiment in several points as follows. The back groove 32c is formed by cutting the corner between the uniting surface of the body 32 and the opposite surface to the sliding surface 30a. Two portions 35a and 35a of the mold glass 35 are larger than the portions 25a and 25a of the first embodiment on the basis that the second regulation grooves 33b and 33b are more deeply cut out. The portions 35a and 35a are connected with an under portion 35b through a curved portion 35c. An opening portion 35d is provided between both pole-shaped portions of the under portion 35b. The back gap portion 34b is located at the opening portion 35d.

There will now be described a production method of the magnetic head 30 according to the second embodiment with reference to FIGS. 6A to 6F.

Figure 6A:
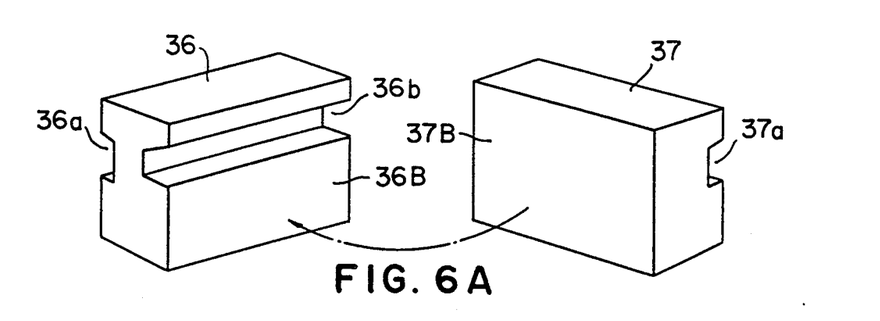
FIGS. 6A to 6F are perspective views respectively showing manufacturing steps of the magnetic head according to the second embodiment of the present invention.

As shown in FIG.6A, a first shallow-and-long groove 36a and a first deep-and-long groove 36b are formed on a first material 36 for the half body 32, which become the guide 32a and the groove 32b for winding, respectively. At the same time, a second shallow-and-long groove 37a is formed on a second material 37 to become the second winding guide 33a. Numerals 36B and 37B are the uniting surfaces of both materials 36 and 37. Both materials 36 and 37 are made of ferromagnetic substance such as a ferrite of manganese and zinc.

Figure 6B:
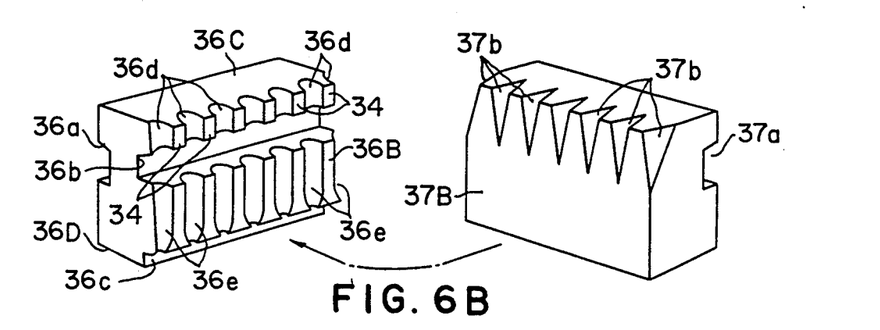

Next, as shown in FIG. 6B, a corner of the surface 36B and a surface 36D is cut parallel to groove 36b to form a second deep-and-long groove 36c corresponding to the back groove 32c. Then, a plurality of notches 36d are formed on a surface between the groove 36b and the surface 36C by cutting out several portions of the uniting surface 36B in the transverse direction to the groove 36b. A plurality of notches 36e are formed on a surface between grooves 36b and 36c as if the notches 36d were extended to the corner of the surface 36D by the same manner as the notches 36d. The notches 36d and 36e correspond to the notches 26d and 26e, respectively, in the first embodiment shown in FIG. 4B. Then, the gap spacers 34 are attached with a predetermined thickness such as 0.3 micron to partial surfaces of the uniting surface 36B surrounded by the notches 36d and the groove 36b by spattering quartz or the like. On the other hand, a plurality of notches 37b are formed at a corner between a uniting surface 37B and a surface 37C corresponding to the notches 36d. The notches 37b become the second track regulation groove 33b.

Figure 6C:
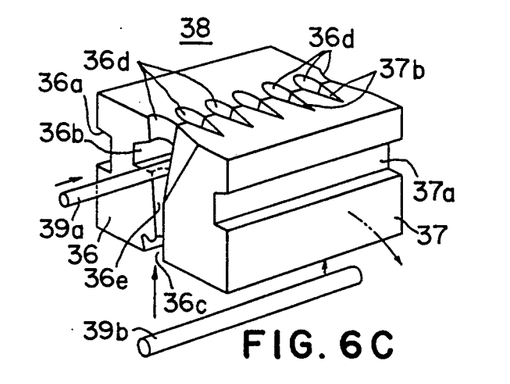

Next, a united body 38 is formed by interconnection of the uniting surfaces 36B and 37B with the coincidence of the notches 36d and 37b, as shown in FIG. 6C. In the united body fixed temporarily, glass rods 39a and 39b are inserted into the deep grooves 36b and 36c. The united body 38 is then inverted and the glass is melted to plug the back groove 36c and the notches 36d, 36e and 37b.

Figure 6D:
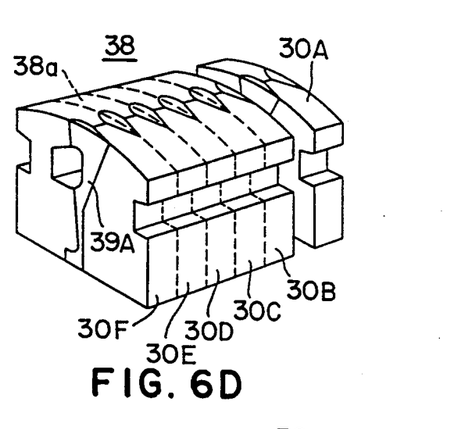
Figure 6E:
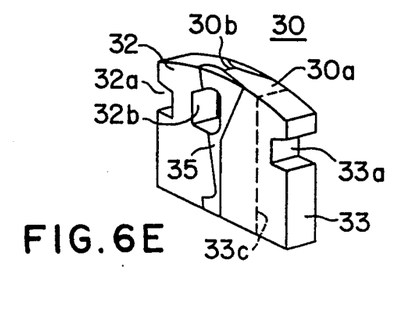
Figure 6F:
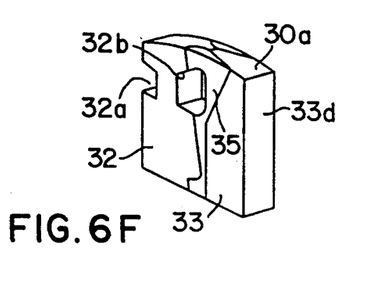

Then, the united body 38 is cooled to a predetermined temperature, so that both materials 36 and 37 are completely fixed by a solid-state glass body 39A which hardens by cooling. After that, as shown in FIG. 6D, a curved surface 38a of the body 38 is shaped, which becomes the tape sliding surface 30a after completion. The body 38 is sliced into a plurality of magnetic heads 30A to 30F according to the article's size in the same manner as shown in FIG. 4D, so that six heads are obtained. Also, in the second embodiment, if the head 30 is cut out by the dotted line 33c, a head half body for the double azimuth head shown in FIG. 6F is obtained. When two half bodies each having a cutting surface 33d are assembled on the base with facing the surfaces 33d, the double azimuth head is completed.

In the magnetic head 30 of the second embodiment, an angle $DEG_1$ is four or five degrees and an angle $DEG_2$ is fifteen degrees.

Figure 7:
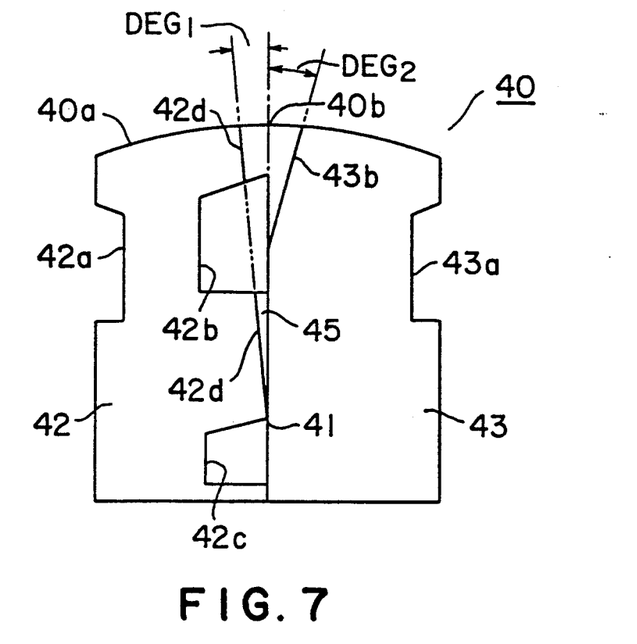
FIG. 7 is a front view showing a magnetic head according to a third embodiment made in accordance with the method of the present invention.

Although the track regulation groove 22d is set to have the angle $DEG_1$ of 4 degrees from the starting point 21 in the head 20 of the first embodiment, the present invention is not limited to this configuration. For example, in a third embodiment shown in FIG. 7, a magnetic head 40 is cut to a slant of 5 degrees from an upper corner of a back groove 42c as a starting point 41. Other elements of the head 40 according to the third embodiment are the same as the head 20 of the first embodiment. An angle $DEG_2$ for setting the second regulation groove 43b is fifteen degrees or the same angle as head 20 of the first embodiment.

Figure 8:
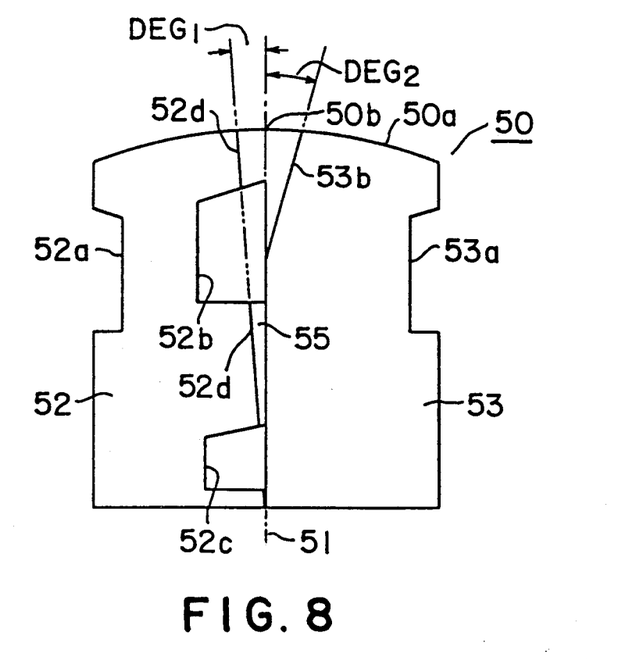
FIG. 8 is a front view showing a magnetic head according to a fourth embodiment made in accordance with the method of the present invention.

Furthermore, the magnetic head 50 of a fourth embodiment shown in FIG.8, has a first track regulation groove 52d which is cut out from the starting point 51 to an angle $DEG_1$ of 3.5 degrees.

As described in detail, since the magnetic head according the present invention which comprises the first half body including a back groove formed by cutting off a part nearby the other end surface opposite to the surface on which the sliding surface is formed, and a pair of first track width regulation grooves are formed by cutting off both corners of the joined plane thereof in a manner of having a slant of a predetermined angle from a portion nearby the opposite end in a direction of the sliding surface and being across the winding groove; the second half body includes a pair of second track width regulation grooves cut out of both corners between the joined plane and the sliding surface on a slant of a predetermined angle from the middle of the winding groove to the sliding surface; and mold glass is filled into the back groove and the first and second track width regulation grooves in order to fix the first and second half bodies by solidification after cooling. Accordingly, the magnetic head is sufficient to maintain the back gap and proper condition of fixing the half bodies so that it is possible to prevent an occurrence of damage such as cracking of the joined surfaces of the half bodies and to assure mechanical strength.

Furthermore, the production method of the magnetic head according to the present invention comprises cutting out a second deep-and-long groove corresponding to a back groove of a completed head parallel to a first deep-and-long groove corresponding to a winding groove of a completed head on a joined plane of a first core half body material which is made of ferromagnetic substance, corresponding to a plurality of first magnetic core half bodies; cutting a plurality of first notches on a slant from portions nearby the second deep groove to the surface of a side of the first deep groove transverse to the first deep groove; cutting a plurality of second notches corresponding to the first notches on a joined plane of a second core half body material which is made of ferromagnetic substance and corresponding to a plurality of second magnetic core half bodies; connecting the first material with the second material at both joined surfaces by causing the first and second notches to correspond with each other; fixing the first and second materials by cooling and solidification of melted glass which is molded into the second deep groove and the first and second notches; regulating the whole shape of a joined body by adding a predetermined treatment to a predetermined outer surface; and dividing the joined body into a plurality of magnetic heads having a predetermined shape by slicing at portions of the notches. Accordingly, it is possible to properly connect and fix the first and second half body materials to each other and thereby improve the manufacturing yield.

Furthermore, as a head having a complicated shape is manufactured by simple steps, it is possible to reduce the manufacturing cost of the magnetic head.

What is claimed is:

1. A method for producing a magnetic head comprising:

providing a first pole-shaped body of ferromagnetic material;

cutting a first deep and long groove in a first surface of said first pole-shaped body;

cutting a second deep and long groove in said first surface of said first pole-shaped body parallel and spaced from said first groove;

cutting a third deep and long groove in a second surface of said first pole-shaped body parallel to said first groove, said second surface facing in a direction substantially oppositely to said first surface;

cutting a plurality of first notches in said first surface of said first pole-shaped body at an angle to said first surface and extending substantially transversely across said first deep and long groove to said second deep and long groove;

providing a second pole-shaped body of ferromagnetic material;

providing first and second oppositely facing surfaces on said second pole-shaped body;

cutting a deep and long groove in said second surface of said second pole-shaped body;

cutting a plurality of second notches in a corner of said first surface of said second pole-shaped body at an angle to said first surface thereof;

positioning said first and second pole-shaped bodies together with said first surfaces thereof in abutting contacting relationship with said groove in said second body parallel to said third groove in said first body and with said notches coinciding;

molding melted glass in said coinciding notches and said first and second grooves in said first pole-shaped body;

solidifying said glass in said notches and first and second grooves to join said pole-shaped bodies together;

regulating the shape of said joined bodies by a predetermined treatment to a predetermined outer surface thereof; and dividing said joined body in planes extending through said notches and grooves into a plurality of magnetic heads having a predetermined shape wherein said first and second pole shaped bodies provide first and second head core half bodies, respectively, said first deep and long groove in said first pole-shaped body forms a winding groove in said first head core half body of each magnetic head, said third deep and long groove in said first pole-shaped body forms a first winding guide in said first head core half body of each magnetic head, said deep and long groove in said second pole-shaped body forms a second winding guide in said second head core half body of each magnetic head, and said second deep and long groove in said first pole-shaped body and said notches are filled with molded glass attaching said half bodies together to form each magnetic head.

2. The method as claimed in claim 1 and further comprising:

prior to said glass molding step, forming a gap spacer by spattering a non-magnetic material having a higher melting point than said glass on at least a part of said first surface on at least one of said first and second pole-shaped bodies.

3. The method as claimed in claim 2 wherein:

said gap spacer forming step is carried out after said first notch forming step by spattering said non-magnetic material on at least a part of said first surface of said first pole-shaped body at least partially surrounded by said first notches and said first groove.

4. The method as claimed in claim 1 and further comprising:

cutting said first notches at an angle of four degrees relative to said first surface on said first pole-shaped body; and cutting said second notches at an angle of fifteen degrees relative to said first surface on said second pole-shaped body.

5. The method as claimed in claim 2 and further comprising:

cutting said first notches at an angle of four degrees relative to said first surface on said first pole-shaped body; and cutting said second notches at an angle of fifteen degrees relative to said first surface on said second pole-shaped body.

6. The method as claimed in claim 3 and further comprising:

cutting said first notches at an angle of four degrees relative to said first surface on said first pole-shaped body; and cutting said second notches at an angle of fifteen degrees relative to said first surface on said second pole-shaped body.

7. The method as claimed in claim 1 and further comprising:

making each magnetic head into a double azimuth head by cutting off a portion of said second head half body containing said second winding guide after said dividing step.

8. The method as claimed in claim 2 and further comprising:
   making each magnetic head into a double azimuth head by cutting off a portion of said second head half body containing said second winding guide after said dividing step.

9. The method as claimed in claim 3 and further comprising:
   making each magnetic head into a double azimuth head by cutting off a portion of said second head half body containing said second winding guide after said dividing step.

10. The method as claimed in claim 4 and further comprising:
    making each magnetic head into a double azimuth head by cutting off a portion of said second head half body containing said second winding guide after said dividing step.

11. The method as claimed in claim 5 and further comprising:
    making each magnetic head into a double azimuth head by cutting off a portion of said second head half body containing said second winding guide after said dividing step.

12. The method as claimed in claim 6 and further comprising:
    making each magnetic head into a double azimuth head by cutting off a portion of said second head half body containing said second winding guide after said dividing step.

* * * * *